Feb. 5, 1924.
R. A. PICARD
CARD INDEX
Filed Oct. 24, 1922    2 Sheets-Sheet 1
1,482,699
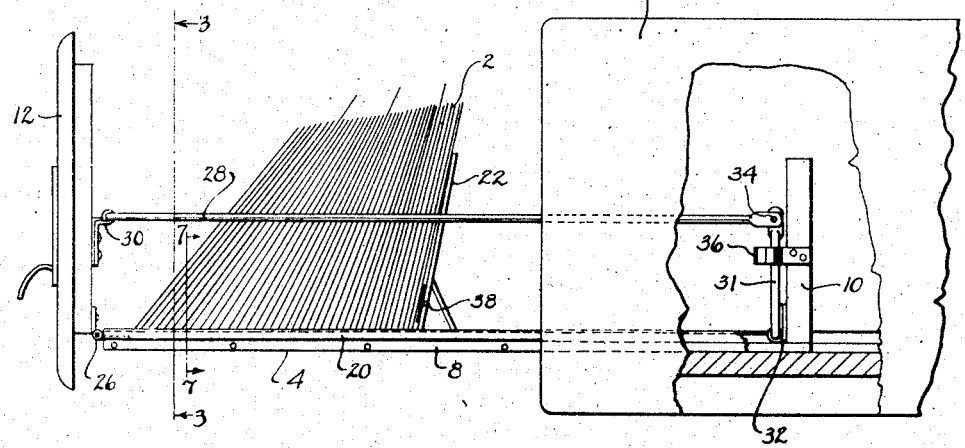
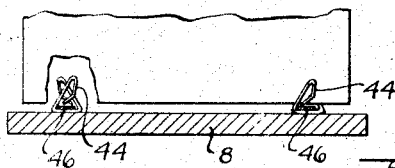
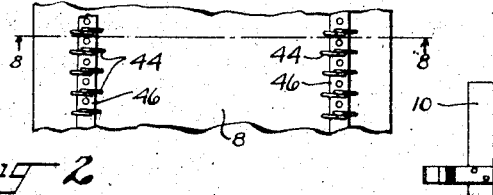
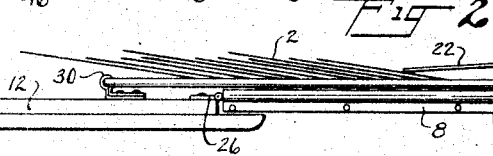
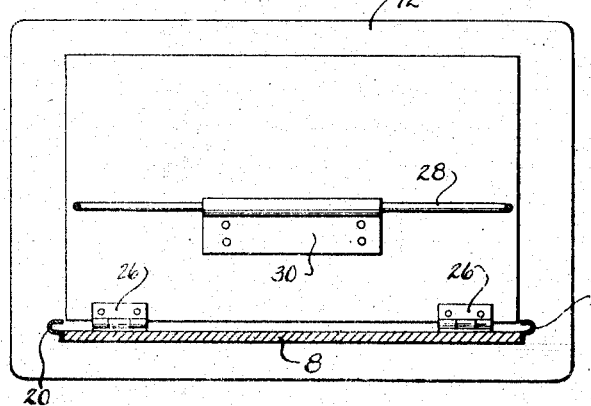
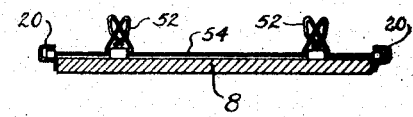
INVENTOR
Richard A. Picard
BY Newell & Spencer
ATTORNEYS Feb. 5, 1924.
R. A. PICARD
CARD INDEX
Filed Oct. 24, 1922 2 Sheets-Sheet 2
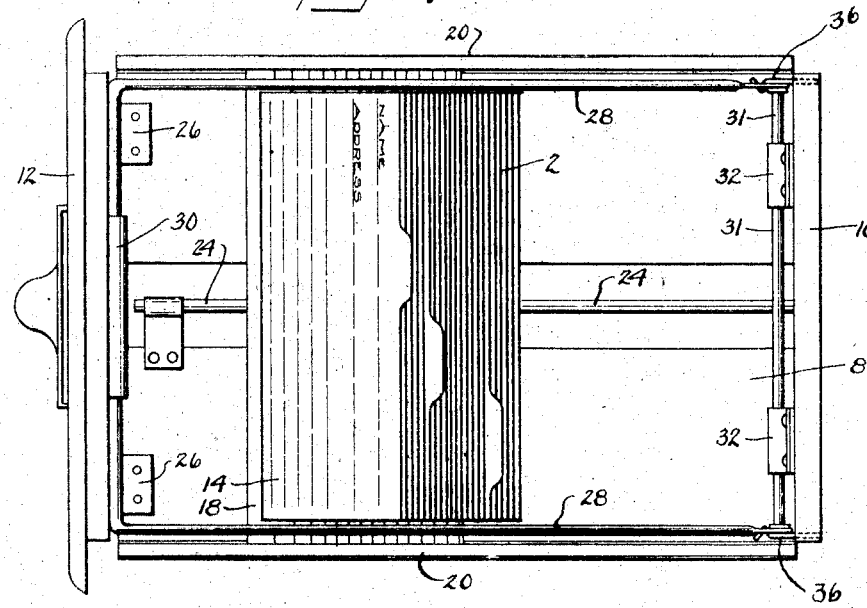
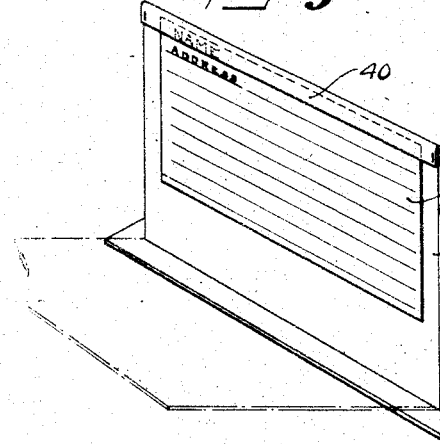
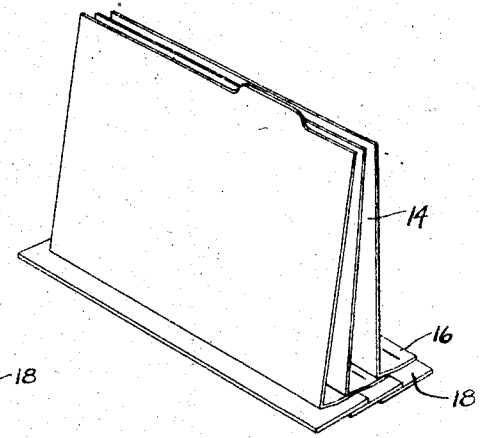
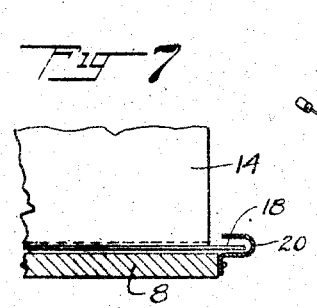
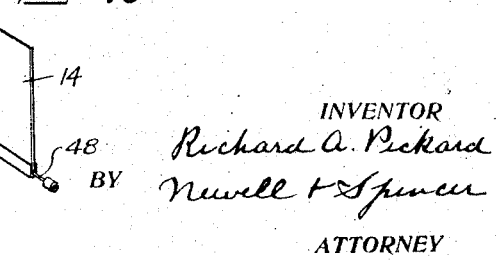
INVENTOR
Richard A. Pickard
BY Newell & Spencer
ATTORNEY Patented Feb. 5, 1924.

1,482,699

UNITED STATES PATENT OFFICE.

RICHARD A. PICARD, OF NEW YORK, N. Y.

CARD INDEX.

Application filed October 24, 1922. Serial No. 596,577.

*To all whom it may concern:*

Be it known that I, RICHARD A. PICARD, a citizen of the United States, residing at New York, N. Y., have invented a certain new and useful Improvement in Card Indexes, of which the following is a clear, full, and exact description.

This invention relates to card indexes.

In certain indexes, the cards are contained in a drawer, box, or other suitable holder and are supported in a substantially vertical position so that the forward face of each card may be inspected. This is known as the vertical system and enables the matter upon one entire face of the respective cards to be conveniently and rapidly inspected. In another type of index, the cards are supported in a holder in a substantially flat overlapping relation and the inner margins thereof are held in spaced relation so that the outer margin of each card is always exposed. This system, which is known as the "visible" or "visible index" system, has the advantage that an index, word or item may be placed on the margin of each card and the index items on the several cards are all visible at the same time. In this system, the outer face of a card is exposed for reading by lifting the preceding cards.

In both the above systems it has been the practice to use only one face of each of the cards in filling out the same, thereby wasting considerable space. It is obvious that in the vertical system it is impracticable to use both faces of the card on account of the inconvenience involved in reading the material on the inner face thereof. In the visible system it is possible to inspect the inner faces of the cards if the drawers or holders in which the cards are mounted are removed from the container or casing. Obviously, however, this involves some inconvenience.

One of the principal objects of the present invention is to produce a novel and improved card index having the advantages of both the vertical system and the visible index system.

Another object of the invention is to produce a card index in which both sides of each card may readily and conveniently be read so that both sides may advantageously be used for the matter to be indexed.

With the above and other objects in view, the invention consists in a card index embodying the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1 is a view in side elevation, partly broken away and partly in section, of a card index embodying the invention illustrating the same when employed as a vertical system;

Fig. 2 is a view in side elevation, of certain of the parts shown in Fig. 1 illustrating the same when employed as a "visible index" system;

Fig. 3 is a detail sectional view taken substantially on the line 3—3 of Fig. 1;

Fig. 4 is a plan view of certain of the parts shown in Fig. 1;

Fig. 5 is a detail perspective view illustrating one form of index card which may be employed;

Fig. 6 is a detail perspective view illustrating several cards in assembled relation;

Fig. 7 is a detail sectional view taken substantially on the line 7—7 of Fig. 1;

Fig. 8 is a sectional view taken through the base of the holder and illustrating a modified holder for holding the cards;

Fig. 9 is a plan view of the construction shown in Fig. 8;

Fig. 10 is a perspective view illustrating a modification of the card construction which may be employed in connection with the card holder shown in Figs. 1 to 7 inclusive; and Fig. 11 is a view similar to Fig. 8 illustrating another construction for holding the cards in the holder illustrated in Figs. 1 to 7 inclusive.

In the preferred form of the invention illustrated in Figs. 1 to 7 inclusive, the cards indicated at 2 are contained in a suitable holder indicated as a whole at 4. This holder preferably consists of a drawer arranged to slide in a casing 6. This drawer comprises a base 8, a rear end wall 10 rigidly secured to the base and a forward end wall 12 which forms the front of the drawer.

The cards 2 are preferably constructed as shown in Figs. 5 and 6. The cards shown in these figures each comprises a body 14 and a foot portion 16 bent at an angle to the body, the portion at the meeting point of the foot and body forming a hinge for the card. The foot of each card is secured to a base plate 18 preferably of the card material. The cards are placed in the drawer of the index with the cards assembled so that the base plates 18 overlap in the manner shown in Fig. 6 and with the base plates of the several cards resting on the base 8 of the drawer. In order to hold the cards in place in the drawer in a reliable manner, each of the base plates 18 of the cards is arranged to project beyond the body of the card at each end thereof and guide rails 20 are secured to the base 8 of the drawer on opposite sides thereof and are provided with channels in which the ends of the base plates are inserted, as shown in Fig. 7.

The cards are preferably assembled in the drawer in the relative positions shown in Fig. 6 with the rear portion of the base plate of each card overlapping the base plate of the next card to the rear and inserted with the corresponding portion of the foot between the base plate and foot of the next card, as shown in this figure. To allow the cards to be thus assembled only the rear part of the foot of each card is attached to the base plate.

To enable the index to be used as a vertical system, a support 22 is provided for engagement with the rear card of the series. This support is mounted on a rod 24 secured to the drawer base for adjustment longitudinally of the rod in the usual manner.

To enable the card index to be used as a visible index system, the front 12 of the drawer is pivoted to the base by hinges 26 so that it can swing forwardly to the position shown in Fig. 2. The drawer front is held in position by means of a U-shaped rod 28, the forward portion of which is engaged in a clip 30 secured to the drawer front so that the rod can turn relatively to the clip.

The parallel arms of the rod extend rearwardly from the drawer front along the sides of the drawer and are supported at their rear ends by means of a U-shaped supporting rod 31 pivotally secured by clips 32 to the rear wall of the drawer. The arms of the supporting rod 31 are pivotally connected at 34 with the arms of the rod 28. The arms of the rod 28 are arranged to engage the ends of the cards to assist in holding the same in position in the drawer.

When the index is used as a vertical system, the parts occupy the positions shown in Fig. 1. The parts are held in the positions shown in this figure by means of latches 36 respectively secured to the end wall 10 and arranged to engage one of the arms of the supporting rod 31.

When the index is to be used as a visible index system the drawer front is swung forwardly to the position shown in Fig. 2 carrying the rod 28 and the supporting rod 31 to the positions shown in this figure. The cards of the index may be then swung forwardly to the positions shown in Fig. 2, the hinge between the body and foot of the several cards allowing the pivotal movement of the cards. The manner in which the cards are assembled as shown in Fig. 6 causes the spacing of the inner portions of the cards so that when the cards are swung forwardly the cards will be in overlapping relation with the outer margin of the upper face of each card exposed. Thus if an index is placed upon these margins of the cards, this index will be visible when the cards are swung forwardly to this position. Preferably, the upper portion of the support 22 is pivoted at 38 to the base of the support, and when the cards are used as a visible index system the upper portion of the support is swung forwardly so that it rests on the rear card, as shown, to assist in holding the cards in position.

The card shown in Fig. 5 differs from those shown in Fig. 6 in that a strip 40, preferably made of celluloid or similar material and folded so as to embrace the upper margin of the card, is mounted on the upper portion of the card and is secured in a suitable manner to the ends of the card. This strip forms a pocket in which a supplemental card indicated at 42 may be inserted with its upper margin beneath the strip, as shown in this figure. The material to be indexed may be placed on this card instead of on the card 14.

Figures 8 and 9 of the drawings illustrate a construction which may be employed for holding and spacing the cards instead of the construction shown in Figs. 1 to 7 inclusive. In the construction shown in Figs. 8 and 9, ordinary cards without any foot or base plate are employed. To hold the cards in position in the drawer a series of clips 44 pivotally secured to the base of the drawer by means of metal strips 46 are employed to receive the cards, the cards being inserted in the clips in the manner shown in this figure. Figs. 10 and 11 illustrate two different constructions which may be employed for holding the card in connection with the drawer construction illustrated in Figs. 1 to 7 inclusive. In the construction shown in Fig. 10 a rod 48 is secured to the inner edge of the card preferably by means of a strip of cloth 50 folded about the rod and pasted to the opposite sides of the card. The ends of the rod 48 project beyond the ends of the card and are provided with card-spacing enlargements adapted to be inserted in the channels in the guide rails 20.

In the construction shown in Fig. 11, card-holding clips 52 are mounted upon a wire 54 having enlargements at its opposite ends extending beyond the ends of the card. In employing this construction, the enlargements at the ends of the wire are inserted in the channels in the guide rails 20.

The card index above described obviously has the advantages of both the vertical and the visible index card systems. When the material upon the forward faces of the cards is to be read, the index is used as a vertical system. When the marginal index is to be inspected or the material upon the rear faces of the cards is to be read, the front of the drawer is swung downwardly to the position shown in Fig. 2 and the cards are swung forwardly to the position shown in this figure. The material upon the rear faces of the cards then may be read in the same manner as usual in this system, by lifting the card at the rear of the card to be read.

Both faces of the card may be entirely filled with material in this index, thereby enabling a great saving of space to be made. The construction is comparatively simple and the shift from the vertical system to the visible index system may be made almost instantly.

Having explained the nature and object of the invention, and having specifically described a construction embodying the invention in its preferred form, what I claim is—

1. A card index having, in combination, a series of index cards, means for supporting the cards in a substantially vertical position so that one face of each card may be inspected, arranged to allow the cards to be shifted to a substantially flat position, and means to cause the cards to assume a relatively overlapping relation with the outer margin of one face of each card exposed when shifted to the latter position.

2. A card index having, in combination, a series of index cards, means for supporting the cards in a substantially vertical position, so that one face of each card may be inspected, arranged to allow the cards to be shifted to a substantially flat position and spacing means for the inner portions of the cards arranged to cause the cards to assume a relatively overlapping relation with the outer margin of the opposite face of each card exposed when shifted to the latter position.

3. A card index having, in combination, a series of index cards, means for supporting the cards in a substantially vertical position so that one face of each card may be inspected, arranged to allow the cards to be shifted to a substantially flat position, and end guides and spacing means for the inner portions of the cards arranged to cause the cards to assume a relatively overlapping relation with the outer margin of the opposite face of each card exposed when shifted to the latter position.

4. A card index having, in combination, a series of index cards, a drawer for containing the cards, means in the drawer for supporting the cards in a substantially vertical position so that the forward face of each card may be inspected, means for supporting the forward end of the drawer so that it may be swung forwardly to allow the cards to be shifted to a substantially flat position, and means to cause the cards to assume a relatively overlapping relation with the outer margin of the opposite face of each card exposed when shifted to the latter position.

5. A card index having, in combination, a series of index cards, a container for the cards, means for supporting the cards in the container arranged to locate the inner margins of the cards in spaced relation and to allow each card to swing about an axis substantially coincident with said margin, and means for supporting the cards in a substantially vertical position so that one face thereof may be inspected, arranged to allow the cards to be shifted to a substantially flat position in the container.

6. A card index having, in combination, a series of index cards, a container for the cards, guide rails mounted on the base of the container, devices mounted on the inner portion of each card extending beyond the ends of the card for engaging said guide rails to hold the card in the container, said means being also arranged to engage the adjacent cards to space the inner portions of the cards and means in the container for supporting the cards in a substantially vertical position so that one face may be inspected, arranged to allow the cards to be shifted to a substantially flat position.

7. A card index having, in combination, a series of index cards each having a body and a base plate extending beyond the ends of the card body to which the card body is pivotally attached, guide rails on the base of said container to receive the ends of said base plate to hold the cards in position in the container, the base plates of the cards being arranged to overlap so as to space the inner portions of the cards, and means in the container for supporting the cards in a substantially vertical position so that one face thereof may be inspected, arranged to allow the cards to be shifted to a substantially flat position in the container.

8. A card index having, in combination, a series of index cards, a drawer for holding the cards having a base and a front pivotally connected to the base so that it may be swung forward into substantially the plane of the base, means for holding the front of the drawer in a vertical position arranged to allow the same to swing forwardly at the will of the operator, a support mounted for longitudinal adjustment on the base of the drawer for supporting the cards in a substantially vertical position in the drawer, guide rails having channels and located on the opposite sides of the base of the drawer, means associated with the inner portion of each card and arranged to engage in the channels in the guide rails to hold the card in position in the drawer and for engaging the corresponding means on the adjacent cards to space the inner portions of the cards, the connection between the cards and said means arranged to allow each card to swing about an axis adjacent its inner margin.

Signed at New York, N. Y., this 17th day of October, 1922.

RICHARD A. PICARD.